United States Patent [19]

Roisen

[11] Patent Number: 4,465,316
[45] Date of Patent: Aug. 14, 1984

[54] COLLAPSIBLE STRUCTURE FOR USE WITH A RECREATIONAL VEHICLE

[76] Inventor: David M. Roisen, Rte. Two, Dawson, Minn. 56232

[21] Appl. No.: 363,050

[22] Filed: Mar. 29, 1982

[51] Int. Cl.³ .............................................. B60P 3/32
[52] U.S. Cl. .................................. 296/161; 296/163; 135/88
[58] Field of Search .............. 296/160, 161, 159, 162, 296/163; 135/88

[56] References Cited

U.S. PATENT DOCUMENTS

| | | | |
|---|---|---|---|
| 2,706,132 | 4/1955 | Chaffin | 296/163 |
| 3,195,190 | 7/1965 | Malo | 20/2 |
| 3,226,890 | 1/1966 | Flajole | 52/66 |
| 3,360,891 | 1/1968 | Gardner | 52/69 |
| 3,511,529 | 5/1970 | Cutsinger | 296/23 |
| 3,620,564 | 11/1971 | Wenger | 296/23 |
| 3,633,324 | 1/1972 | Cuylits | 52/66 |
| 3,680,909 | 8/1972 | Greif | 296/161 |
| 3,692,350 | 9/1972 | Radtke | 296/21 |
| 3,763,607 | 10/1973 | Glover | 52/68 |
| 3,889,432 | 6/1975 | Geihl | 52/69 |
| 3,924,366 | 12/1975 | Gibbs | 52/69 |
| 4,072,337 | 2/1978 | Barker | 296/27 |
| 4,103,462 | 8/1978 | Freller | 52/67 |
| 4,109,954 | 8/1978 | Wall | 296/161 |
| 4,155,204 | 5/1979 | Prozinski | 52/69 |
| 4,166,343 | 9/1979 | O'Brian et al. | 52/66 |

*Primary Examiner*—Robert R. Song
*Attorney, Agent, or Firm*—Merchant, Gould, Smith, Edell, Welter & Schmidt

[57] ABSTRACT

An apparatus (10) for the attachment and storage of a collapsible structure (12) to a roof of a recreational vehicle is disclosed. The apparatus (10) includes a guide means (11) fastened to a container (35). Roller means (13) is fastened to the collapsible structure (12) to allow for slidably moving the collapsible structure on the guide means (11). To remove the collapsible structure (12) from the container (35) when in a stored position, the collapsible structure (12) is slid along the guide means (11) until the collapsible structure (12) is outside the container (35). The collapsible structure (12) is then allowed to rotate downward and the collapsible structure (12) is then unfolded. The roller means (13) is releaseably attached to the guide means (11) to provide a free-standing unit. In a first embodiment, the container (35) is constructed for an add-on attachment to the roof of a recreational vehicle. In a second embodiment, the container is an integral portion of a top (44) for attachment to the bed of a pickup truck.

20 Claims, 9 Drawing Figures

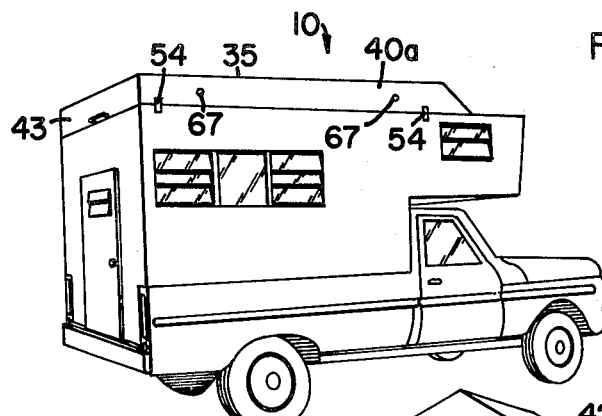
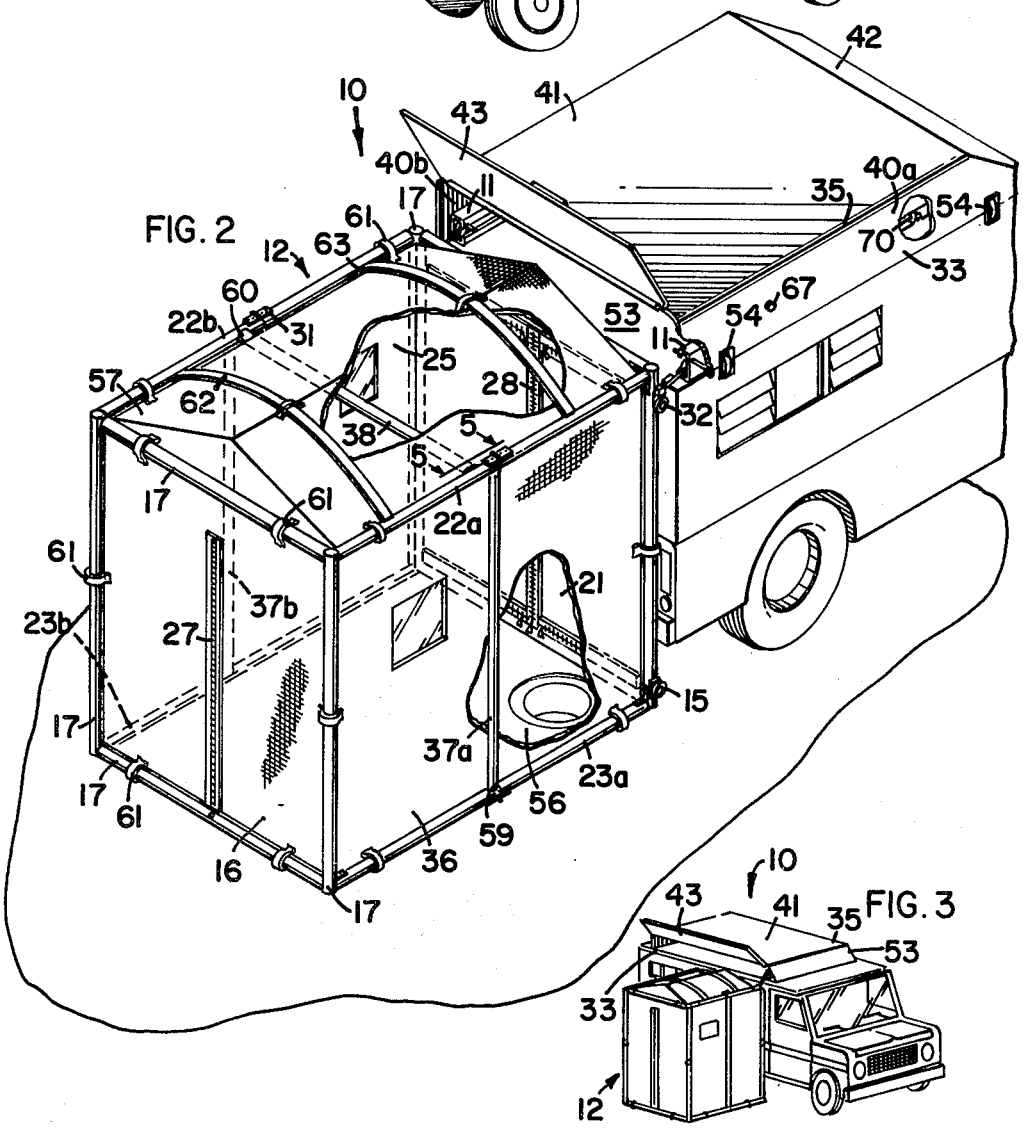
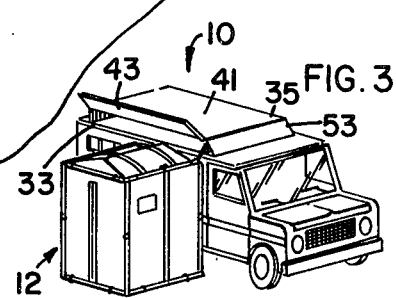

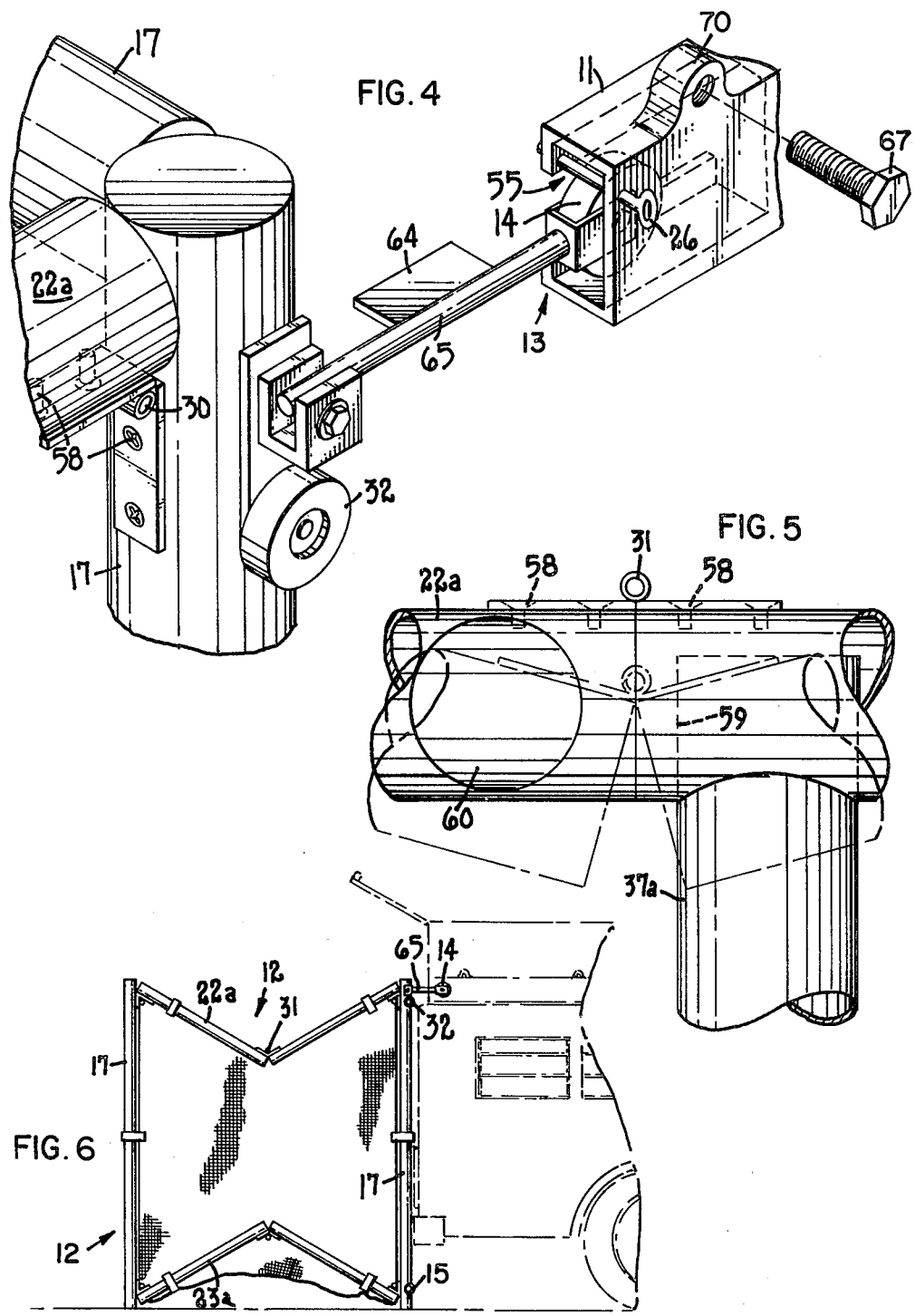

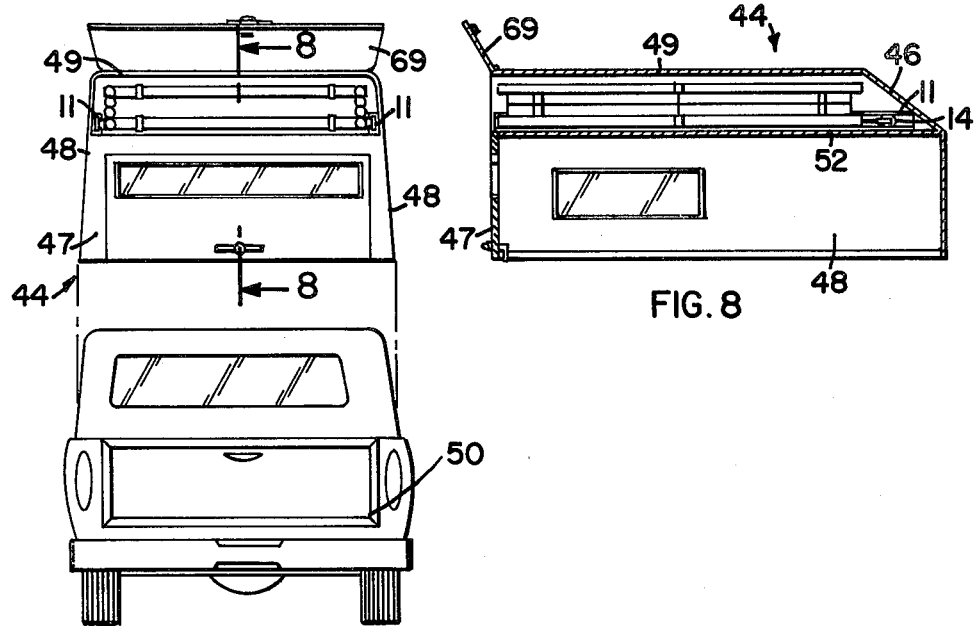
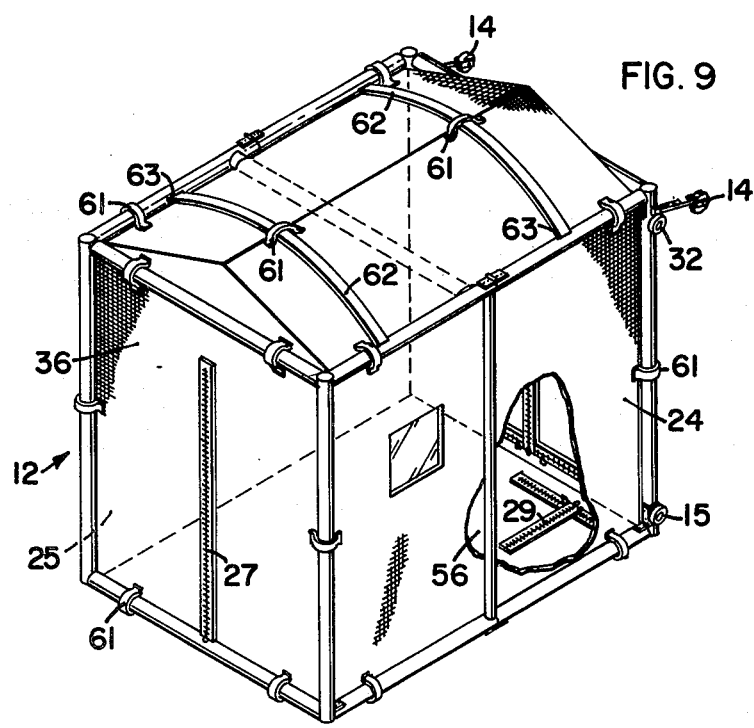

COLLAPSIBLE STRUCTURE FOR USE WITH A RECREATIONAL VEHICLE

BACKGROUND OF THE INVENTION

1. Field of the Invention

This invention relates generally to collapsible or foldable structures and more particularly to collapsible or foldable structures used in combination with a recreational vehicle.

2. Description of the Prior Art

One of the advantages of using a collapsible structure in combination with a recreational vehicle is that additional usable space is provided without a proportionate increase in the outside dimension of the motor vehicle. When the recreational vehicle arrives at its destination, the collapsible structure is unfolded to yield this added usable space. Such structures are generally known in the art and can be generally classified into three major classifications, according to their manner and place of attachment to the motor vehicle.

The first general classification includes those collapsible structures which are an integral part of the recreational vehicle. An example of this is be a motor home that has a side wall hingedly connected to the ceiling. This side wall can be raised to form a canopy. In the interior body of the motor home are located additional panels that swing out to form the completed structure.

The principal disadvantage with this type of apparatus is that they cannot be an add-on to recreational vehicles. They must be built-in, as they are an integral portion of the recreational vehicle.

The second general classification includes those collapsible structures that are later added on to the recreational vehicle and are permanently fixed to the recreational vehicle. An example of this type is seen when a floor panel is pivotally connectable to a wall of a trailer or a camper, so as to be swingable into a position adjacent to the rear of such unit. A collapsible awning is supportable over the floorpanel when the latter is in a horizontal position. Side curtains are attached to the awning and floorpanel so as to enclose the area and provide an additional room.

This type of apparatus must be attached to a side or back wall of the recreational vehicle since there is no method of easily lowering a collapsible structure from the roof of the recreational vehicle. If attached to the roof, it would normally require at least two persons to remove a structure from the roof. While lowering the structure there is always a chance of injury to the structure or persons. If attached to the back end, where there is usually a door to the recreational vehicle, the structure must always be erected to provide access through the door. The added width or length to the recreational vehicle makes driving more difficult. If attached to the side, the total width of the recreational vehicle and collapsible structure may exceed the legal limit. Because it is permanently attached, the structure must always be collapsed before driving the recreational vehicle. Therefore, if the recreational vehicle is used for a short trip from a base camp, the attachment must be collapsed for the short trip and then set up upon return to the base camp.

Like the second general classification, the third general classification of collapsible structures is also an add on to the motor vehicle. However, these structures can be detached from the recreational vehicle. An example of this classification is a collapsible shelter assembly that is stored within a rigid wall container body. This shelter assembly is similar to that described in the second general classification. However, the container is mounted to the motor vehicle with brackets that can be detached. This provides for a free standing room.

This third type solves only the problems associated with the second type that pertains to the structure being permanently affixed. The other problems still remain.

To date, there is no known collapsible structure that is added on to the roof of an existing motor vehicle.

The present invention addresses the problems of the prior art devices and provides an add-on or attachment device that is secured to the roof of a recreational vehicle. The present invention also provides a ready means of raising and lowering the structure and compact storage of the structure when not in use.

SUMMARY OF THE INVENTION

The present invention is an apparatus for the attachment and storage of a collapsible structure to a roof of a recreational vehicle. The apparatus has a container to house the entire apparatus. In the first embodiment, the container is constructed for an add-on attachment to the roof of a recreational vehicle. In the second embodiment, the container is an integral portion of a top for attachment to the bed of a pickup truck.

A guide means is fastened to the container. In the preferred embodiment, the guide means comprises two parallel rails, each being of a generally U-shaped cross section. The rails provide for glidably guiding the collapsible structure when the collapsible structure is moved between a stored position and an extended position.

A roller means is fastened to the collapsible structure. In the preferred embodiment, a first and second roller is in alignment with each of the U-shaped rails. The first roller is pivotally attached to the collapsible structure and the second roller is attached to the collapsible structure. The roller means allow for slideably moving the collapsible structure on the rails.

Typically, the collapsible structure has a collapsible frame with four rigid members forming two side edges, a bottom edge and a top edge of a back section; four rigid members forming two side edges, a bottom edge and a top edge of a front section; and a first and second upper hinged rigid members and a first and second lower hinged rigid members pivotally connecting the front and back sections, thereby forming two side wall sections, a floor section and a ceiling section. A removable support member has a first end releasably connected to the first upper hinged member and a second end releasably connected to the first lower hinged member, and a second removable support member has a first end releasably connected to the second upper hinged member and a second end releasably connected to the second lower hinged member, whereby the upper hinged members are prevented from collapsing. A removable cross support member has a first end releasably connected to the first upper hinged member and a second end releasably connected to the second upper hinged member. A box shaped flexible enclosure, is attached to the collapsible frame. The flexible enclosure in the preferred embodiment is constructed from canvas.

To remove the collapsible structure from the container when it is in the stored position, the structure is slid along the rails, until the structure is outside the container. The structure is then allowed to rotate downward with the top end still being attached to the rails by means of the pivotally attached rollers. The four hinged members are then extended to form a rigid frame of the collapsible structure. As the hinged members are extended, the flexible enclosure is unfolded to form a tent.

The pivotally attached rollers are provided with a release mechanism whereby the rollers may become disengaged from the rails. When the rollers are disengaged, the collapsible structure is no longer attached to the recreational vehicle, and the collapsible structure is a free standing unit.

The collapsible structure may have a zipper portion in the back section to allow people to enter the structure. There may also be a zipper portion in the front section to allow people to enter the collapsible structure directly from the recreational vehicle. There may also be a zipper portion defining a hole in the floor section of the collapsible structure. This will allow the collapsible structure to be used for an ice fish house.

To store the collapsible structure, the four hinged members are collapsed and the ceiling section of the collapsible structure folds down and the floor section folds up, thus collapsing upright against the back of the recreational vehicle. The bottom is then rotated upwards and rolled into the container for storage.

BRIEF DESCRIPTION OF THE DRAWING

FIG. 1 is a perspective view showing one embodiment of the present invention attached to a pickup camper.

FIG. 2 is a perspective view of the present invention shown in FIG. 1 attached to a pickup top showing the collapsible structure in an extended position, with portions thereof broken away.

FIG. 3 is a view in perspective of of the present invention shown in FIG. 1 attached to a van and the collapsible structure in an extended position.

FIG. 4 is an enlarged perspective view of a portion of the collapsible frame, guide means and roller means shown in FIG. 2.

FIG. 5 is a view in side elevation as viewed generally along the line 5—5 of FIG. 2.

FIG. 6 is a view in side elevation showing the collapsible structure of FIG. 2, in a partially collapsed position.

FIG. 7 is an explosed view in side elevation showing another embodiment of the present invention.

FIG. 8 is a cross-sectional view of the top shown in FIG. 7, generally as viewed along the line 8—8 of FIG. 7.

FIG. 9 is a view in perspective showing the collapsible structure shown in FIG. 2, in a free-standing position.

DETAILED DESCRIPTION OF THE INVENTION

Referring to the figures, wherein like numerals represent like parts throughout the several views, there is generally illustrated at 10 in FIGS. 1 and 2, an apparatus for the attachment and storage of a collapsible structure to a roof of a recreational vehicle. The apparatus 10 has a container 35. The container 35 has two sidewalls 40a and 40b, a ceiling section 41, a floor section 53, a front section 42, and a back section 43. The back section 43 is a door that swings upwardly to create an opening to allow the collapsible structure 12 to move from a stored position inside the container 35 to an extended position outside the container 35. The collapsible structure slides out the back section 43 and parallel to the side edge 33 as shown in FIG. 2, or perpendicular to the side edge 33 as shown in FIG. 3. The container 35 is made from a lightweight material, such as fiberglass. However, it is understood that other suitable materials may also be used. The container 35 is attached to the roof of the recreational vehicle by means of a clamp 54 or other suitable fastening means.

A guide means 11, having a boss 70, is attached to the side wall 40a and 40b of the container 35, by any suitable means such as a bolt 67. The guide means 11 provides for glidably guiding the collapsible structure whereby the collapsible structure may be moved between a stored position and an extended position. In a preferred embodiment, as shown in FIG. 4, a rail 11 having a generally U-shaped cross-section defines an internal cavity 55 which provides a track for the roller means generally designated as 13. In a preferred embodiment, the guide means 11 comprises two parallel rails 11 each having a generally U-shaped cross-section. The first rail 11 is attached to the sidewall 40a and the second rail 11 is attached to the sidewall 40b of the container 35.

As shown in FIG. 2, FIG. 6 and FIG. 9, the collapsible structure 12 has a collapsible frame. The collapsible frame has four rigid members 17 cooperatively connected to form a rectangular back section 16, four rigid members 17 cooperatively connected to form a rectangular front section 21, a first upper hinged rigid member 22a, a second upper hinged rigid member 22b, a first lower hinged rigid member 23a and a second lower hinged rigid member 23b pivotably connecting said front section 21 and said back section 16 forming a right sidewall section 24 and a left sidewall section 25, a floor section 56 and a ceiling section 57. In one embodiment, as shown in FIG. 4, the first upper member 22a is pivotably connected to the rigid member 17 by means of a hinge 30 that is fastened to the rigid member 17 and upper member 22a by means of a screw 58. The upper member 22b and lower members 23a and 23b are similarly fastened to the rigid members 17. In one embodiment, as shown in FIG. 5, the upper member 22a has two sections that are connected by means of a hinge 31. The hinge 31 is fastened to both sections by screws 58, thereby forming the upper member 22a. The phantom lines of FIG. 5 indicate the position of the hinge 31 when the collapsible structure 12 is in a partially collapsed position.

A first removable support member 37a has a first end releasably connected to the first upper hinged member 22a and a second end releasably connected to the first lower member 23a. A second removable support member 37b has a first end releasably connected to the second upper hinged member 22b and a second end releasably connected to the second lower hinged member 23b. When the support members 37a and 37b are in position, the upper hinged members 22a and 22b are prevented from collapsing. In one embodiment, the upper hinged members 22a and 22b and the lower hinged members 23a and 23b each have an opening 59. The first support member 37a is releasably connected by simply inserting one end into the opening 59 of the upper hinged member 22a and the second end into the opening 59 of the lower hinged member 23a. The second support member 37b is releasably connected to the second upper hinged member 22b and second lower hinged member 23b in a similar manner. A removable cross support member 38 has a first end releasably connected to the first upper hinged member 22a and a second end releasably connected to the second upper hinged member 22b. Similar to the support members 37a and 37b, the cross support member 38 is releasably connected by inserting the first end into an opening 60 of the first upper hinge member 22a and a second end into the opening 60 of the second upper hinged member 22b. The rigid members 17 and upper and lower hinged members 22a, 22b, 23a and 23b may be telescoping to allow for the collapsible structure 12 to be expanded.

A box-shaped flexible closure 36 is attached to the collapsible frame. In one embodiment, the flexible enclosure 36 is made from canvas. However, it is understood that other suitable materials may also be used. The flexible enclosure 36 is attached to the collapsible frame by means of loops 61 that go around the collapsible frame and are attached to the flexible enclosure 36.

The collapsible structure 12 can also have a curved bar 62 releasably connected to the upper hinged members 22a and 22b. The upper hinged members 22a and 22b have an opening 63. A loop 61 is attached to the ceiling section 57. The curved bar 62 passes through the loop 61 and is inserted into the openings 63, whereby the ceiling section 57 is caused to bulge upward.

The flexible enclosure 36 has a zippered portion 27 in the back section 16 and a zippered portion 28 in the front section 21, whereby persons may enter and leave the flexible enclosure. A zippered portion 29 defines a hole in the floor section 56 that may be used when the collapsible structure 12 is used for an ice fishing house.

A roller means designated generally as 13 is fastened to the collapsible structure 12 for slidably moving the collapsible structure 12 on the guide means 11. In one embodiment, the roller means 13 has a first roller 14 pivotably attached to the rigid member 17 of the collapsible structure 12 and is in alignment with the internal cavity 55 of the rail 11. A second roller 15 is attached to the bottom portion of the rigid member 17 of the collapsible structure 12 and is in alignment with the internal cavity 55 of the rail 11. A release means 26 is provided to allow the first roller 14 to be released from the internal cavity 55. In one embodiment, the release means 26 is a pin extending through the rail 11. A third roller 32 is attached to the rigid member 17 of the collapsible structure 12 below the point where the first roller 14 is pivotably attached to the rigid member 17. The third roller 32 enables a collapsible structure 12 to be more easily slid along the rail 11. A stop plate 64 is attached to the rod 65 that pivotably connects the first roller 14 to the rigid member 17.

As shown in FIG. 3, the apparatus 10 for attachment and storage of a collapsible structure 12 to a roof of a recreational vehicle, may also be used when the recreational vehicle is a van.

In an alternative embodiment of the invention a shown in FIG. 7 and FIG. 8, the container 35 is an integral portion of a top, generally designated as 44, to engage the bed of a pickup truck 50. The top has an outer shell which has a front wall 46, a back wall 47, two sidewalls 48, and a roof section 49 cooperatively connected to the walls to form a box like configuration to engage the bed of the pickup truck 50. The roof section 49 has a lower panel 52 substantially parallel to the roof section 49 and cooperatively connected to the sidewalls 48, backwall 47, and front wall 46. The backwall 47 has a door 69 between the roof section 49 and lower panel 52 that swings upward to provide an opening for the collapsible structure 12 to be moved between a stored position and an extended position. The roof section 49, lower panel 52, front wall 46, sidewalls 48 and backwall 47 define the equivalent of the container 35 described in the preceeding embodiments. Similar to the previously described embodiment, the top 44 has a collapsible structure 12, a guide means 11 for glidably guiding the collapsible structure 12, whereby the collapsible structure 12 may be moved between a stored position and an extended position, a roller means 13 fastened to the collapsible collapsible structure 12 for slidably moving the collapsible structure 12 on the guide means 11 and the guide means 11 fastened to the sidewalls 48.

In use, the collapsible structure 12 is slid along the guide means 11 until the first roller 14 comes in contact with the release means 26. The collapsible structure 12 is then allowed to rotate downward until it reaches the ground. The upper hinged members 22a and 22b and the lower hinged members 23a and 23b are then extended. The support members 37a and 37b and cross support member 38 are then inserted to give additional rigidity to the frame. The curved bar 62 is then inserted to cause the ceiling section 57 to bulge upward. The collapsible structure 12 is now ready to be used. If desired, the release means 26 may be removed so that the first roller 14 may be removed from the guide rails 11. In doing so, the collapsible structure 12 is now detached from the recreational vehicle, and the recreational vehicle may be moved from the site of the collapsible structure 12. To store the collapsible structure 12, the support members 37a and 37b, cross support member 38 and curved bar 62 are removed. The hinges 31 are then collapsed. The back section 16 is then pushed up against the front section 21. The collapsible structure 12 is then rotated upward and slid into the stored position by sliding the roller means 13 along the guide means 11.

Other modifications of the invention will be apparent to those skilled in the art in light of the foregoing description. This description is intended to provide specific examples of individual embodiments which clearly disclose the present invention. Accordingly, the invention is not limited to these embodiments or to the use of elements having specific configurations and shapes as presented herein. All alternative modifications and variations of the present invention which follows in the spirit and broad scope of the appended claims are included.

What is claimed is:

1. An apparatus for attachment and storage of a collapsible structure to a roof, having a front edge, a back edge and two side edges, of a recreational vehicle comprising:
    (a) a collapsible structure, said collapsible structure comprising:
        (i) a collapsible frame having four rigid members cooperatively connected to form a rectangular back section, four rigid members cooperatively connected to form a rectangular front section and first and second upper hinged rigid members and first and second lower hinged rigid members pivotally connecting said front and back sections forming two side wall sections, a floor section and a ceiling section; and
        (ii) a box shaped flexible enclosure, attached to said collapsible frame;
    (b) a guide means for glidably guiding the collapsible structure whereby said collapsible structure may be moved between a stored position and an extended position;

(c) a roller means fastened to said collapsible structure for slidably moving said collapsible structure on said guide means;

(d) a container, for attachment to the roof of the recreational vehicle, housing said collapsible structure, said guide means and said roller means; and (e) said guide means fastened to said container.

2. The apparatus of claim 1, wherein said roller means and said guide means provide for slidably moving said collapsible structure substantially parallel to the side edges.

3. The apparatus of claim 1, wherein said roller means and said guide means provide for slidably moving said collapsible structure substantially perpendicular to the side edges.

4. The apparatus of claim 1, wherein said guide means comprises two parallel rails, each having a generally U-shaped cross section, defining an internal cavity.

5. The apparatus of claim 4, wherein said roller means comprises:

(a) a first roller pivotally attached to said collapsible structure and in alignment with said internal cavity of said rail; and (b) a second roller attached to said collapsible structure and in alignment with said internal cavity.

6. The apparatus of claim 1, wherein said collapsible structure further comprises:

(a) a first removable support member, having a first end releasably connected to said first upper hinged member and a second end releasably connected to said second lower hinged member, whereby said upper hinged members are prevented from collapsing; and (b) a removable cross support member having a first end releasably connected to said first upper hinged member and a second end releasably connected to said second upper hinged member.

7. The apparatus of claim 6, wherein said flexible enclosure has a zippered portion defining a hole in said floor section.

8. The apparatus of claim 6, wherein said flexible structure has a zippered portion in said front and back sections, whereby persons may enter said structure.

9. The apparatus of claim 6, further comprising:

(a) at least one curved bar releasably connected to said upper hinged members;

(b) a loop attached to said ceiling section;

(c) said upper hinged members having an opening to receive said curved bar; and (d) said curved bar passes through said loop and is inserted into said openings, whereby said ceiling section is caused to bulge upward.

10. An apparatus for attachment and storage of a collapsible structure to a roof, having a front edge, a back edge and two side edges, of a recreational vehicle comprising:

(a) a collapsible structure, said collapsible structure comprising:

(i) a collapsible frame having four rigid members cooperatively connected to form a rectangular back section, four rigid members cooperatively connected to form a rectangular front section and first and second upper hinged rigid members and first and second lower hinged rigid members pivotally connecting said front and back sections forming two side wall sections, a floor section and a ceiling section;

(ii) a box shaped flexible enclosure, attached to said collapsible frame;

(iii) a first removable support member, having a first end releasably connected to said first upper hinged member and a second end releasably connected to said second lower hinged member, whereby said upper hinged members are prevented from collapsing; and (iv) a removable cross support member having a first end releasably connected to said first upper hinged member and a second end releasably connected to said second upper hinged member;

(b) two parallel rails, each having a generally U-shaped cross section defining an internal cavity for glidably guiding said collapsible structure whereby said collapsible structure may be moved between a stored position and an extended position;

(c) a first roller pivotally attached to said collapsible structure and in alignment with said internal cavity of said rail; and a second roller attached to said collapsible structure and in alignment with said internal cavity of said rail;

(d) a container having two side walls, a ceiling section, a floor section, a front section and a back section for attachment to the roof of the recreational vehicle, housing said collapsible structure, said rails and said rollers; said back section having an opening to allow said collapsible structure to move from the stored position inside the container to the extended position outside the container; and (e) said rails fastened to said side walls of said container.

11. A top for a bed of a pickup truck comprising:

(a) an outer shell having a front wall, back wall and two side walls connecting said front and back walls and a roof section cooperatively connected to said walls to form a box-like configuration to engage the bed;

(b) a lower panel substantially parallel to said roof section and cooperatively connected to said side walls, back wall and front wall, wherein a storage space is defined between said roof section and said lower panel;

(c) a collapsible structure, said collapsible structure comprising:

a collapsible frame having four rigid members cooperatively connected to form a rectangular back section, four rigid members cooperatively connected to form a rectangular front section and first and second upper hinged rigid members and first and second lower hinged rigid members pivotally connecting said front and back sections forming two side wall sections, a floor section and a ceiling section; and (ii) a box shaped flexible enclosure, attached to said collapsible frame;

(d) a guide means for glidably guiding said collapsible structure whereby said collapsible structure may be moved between a stored position and an extended position;

(e) said guide means fastened to said side wall; and (f) a roller means fastened to said collapsible structure for slidably moving said collapsible structure on said guide means, the collapsible structure being slidably moved into the storage space.

12. The top of claim 11, wherein said roller means and said guide means provide for slidably moving said collapsible structure substantially perpendicular to said back wall.

13. The top of claim 11, wherein said roller means and said guide means provide for slidably moving said collapsible structure substantially perpendicular to said side walls.

14. The top of claim 11, wherein said guide means comprises two parallel rails, each having a generally U-shaped cross section, defining an internal cavity.

15. The top of claim 14, wherein said roller means comprises:
   (a) a first roller pivotally attached to said collapsible structure and in alignment with said internal cavity of said rail; and
   (b) a second roller attached to said collapsible structure and in alignment with said internal cavity.

16. The top of claim 11, wherein said collapsible structure further comprises:
   (a) a first removable support member, having a first end releasably connected to said first upper hinged member and a second end releasably connected to said first lower hinged member having a first end releasably connected to said second upper hinged member and a second end releasably connected to said second lower hinged member, whereby said upper hinged members are prevented from collapsing; and
   (b) a removable cross support member having a first end releasably connected to said upper hinged member and a second end releasably connected to said second upper hinged member.

17. The top of claim 16, wherein said flexible enclosure has a zippered portion defining a hole in said floor section.

18. The top of claim 16, wherein said flexible structure has a zippered portion in said front and back sections, whereby persons may enter said structure.

19. The top of claim 16, further comprising:
   (a) at least one curved bar releasably connected to said upper hinged members;
   (b) a loop attached to said ceiling section;
   (c) said upper hinged members having an opening to receive said curved bar; and
   (d) said curved bar passes through said loop and is inserted into said openings, whereby said ceiling section is caused to bulge upward.

20. A top for a bed of a pick-up truck comprising:
   (a) an outer shell having a front wall, back wall and two side walls connecting said front and back walls and a roof section cooperatively connected to form a box-like configuration to engage the bed;
   (b) a lower panel substantially parallel to said roof section and cooperatively connected to said side walls, back wall and front wall, wherein a storage space is defined between said roof section and said lower panel;
   (c) a collapsible structure, said collapsible structure comprising:
      (i) a collapsible frame having four rigid members cooperatively connected to form a rectangular back section, four rigid members cooperatively connected to form a rectangular front section and first and second upper hinged rigid members and first and second lower hinged rigid members pivotally connecting said front and back sections forming two side wall sections, a floor section and a ceiling section; and
      (ii) a box shaped flexible enclosure, attached to said collapsible frame;
   (d) two parallel rails, each having a generally U-shaped cross section defining an internal cavity for glidably guiding said collapsible structure whereby said collapsible structure may be moved between a stored position and an extended position, the collapsible structure being slidably moved into the storage space;
   (e) a first roller pivotally attached to said collapsible structure and in alignment with said internal cavity of said rail;
   (f) a second roller attached to said collapsible structure and in alignment with said internal cavity; and
   (g) said rails fastened to said sidewalls.

* * * * *